Figure 1:
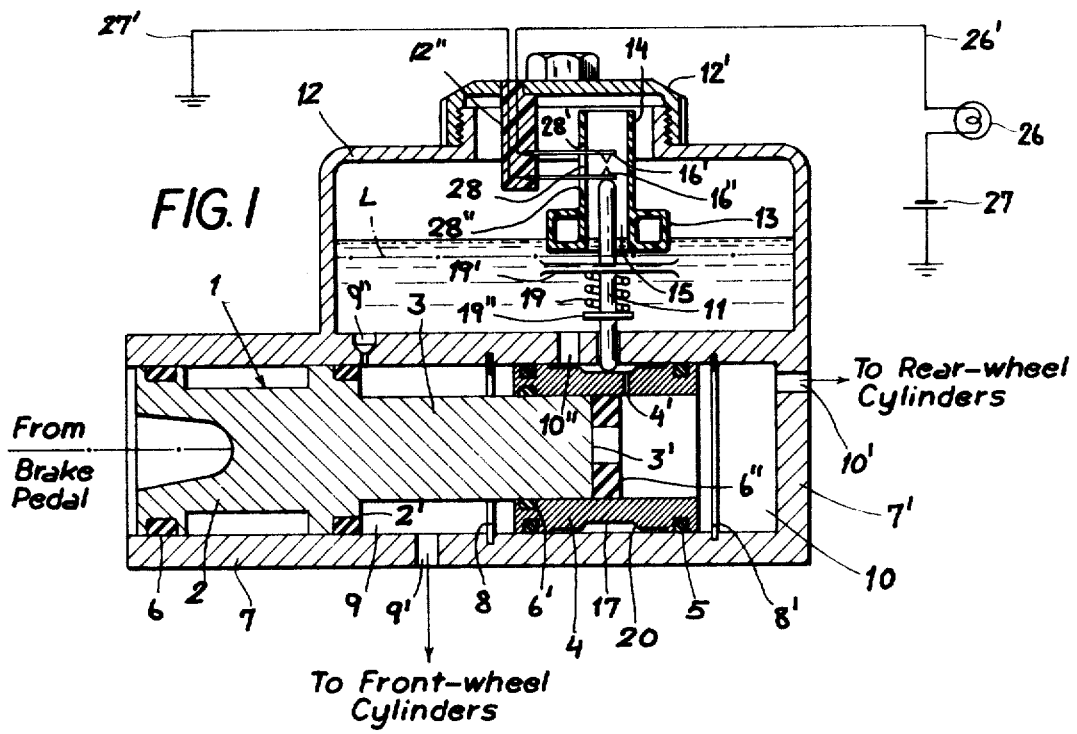

United States Patent

[11] 3,593,267

| [72] | Inventor | Hans-Christof Klein<br>Hattersheim, Germany |
|---|---|---|
| [21] | Appl. No. | 718,630 |
| [22] | Filed | Apr. 3, 1968 |
| [45] | Patented | July 13, 1971 |
| [73] | Assignee | Teves Alfred GmbH<br>Frankfurt am Main, Germany |
| [32] | Priority | May 9, 1967 |
| [33] | | Germany |
| [31] | | T 33 820 |

[54] ELECTRICAL WARNING SYSTEM FOR VEHICULAR HYDRAULIC DUAL-BRAKE INSTALLATIONS
10 Claims, 4 Drawing Figs.

[52] U.S. Cl. .................................................. 340/52,
340/59, 200/82, 200/84
[51] Int. Cl. .................................................. G08b 21/00,
H01h 29/30, H01h 35/38
[50] Field of Search.......................................... 340/42, 52
B, 52 C, 59, 244; 200/84, 82, 81.5

[56] References Cited
UNITED STATES PATENTS

| 3,011,595 | 12/1961 | Heiss et al. | 340/52 UX |
| 3,382,333 | 5/1968 | Ihnacik, Jr. | 200/82 |
| 3,421,322 | 1/1969 | Reznicek | 340/52 UX |
| 3,451,051 | 6/1969 | Randol | 340/52 X |

*Primary Examiner*—Alvin H. Waring
*Attorney*—Karl F. Ross

ABSTRACT: An electrical warning system for a dual hydraulic-brake network in which a tandem dual master cylinder whose floating piston shifts upon failure of one of the networks. This piston operates a switch which also may be operated by the fluid level in the brake-fluid reservoir to signal either or both of a failure in a network and a drop in the brake-fluid level.

Hans-Christof Klein
INVENTOR.

BY
Karl F. Ross
Attorney

Hans-Christof Klein
INVENTOR.

BY Karl J. Ross
Attorney

ELECTRICAL WARNING SYSTEM FOR VEHICULAR HYDRAULIC DUAL-BRAKE INSTALLATIONS

My invention relates to an electrical warning system for vehicular dual-brake systems equipped with a two-chamber master cylinder communicating with a reservoir for hydraulic brake fluid.

An object of my invention is to insure the operating safety of a vehicle with two hydraulic brake circuits by actuating an alarm to warn the driver if either of these circuits has lost pressure to such an extent that further fluid loss would seriously endanger his vehicle.

A related object is to provide similar alarm means to apprise the driver of a near-depletion of the brake-fluid supply in the reservoir.

To attain the first of these objects, my invention provides a piston serving as a mobile partition between two chambers of a master cylinder, a switch positioned for actuation by this piston, and an alarm device electrically connected to the switch to apprise the driver of a dangerous condition in the brake system, as by lighting a lamp on the dashboard of the vehicle, whenever a driver-operated (e.g. pedal-controlled) plunger independent of the aforementioned piston exerts pressure upon the brake fluid in these chambers.

The piston may be an axially slidable sleeve through which a reduced extremity of the driver-operated plunger passes so that the sleeve can move axially if the pressure acting upon the end face of this extremity differs significantly from that acting upon an annular shoulder on the other side of the sleeve.

The switch may simply be a pair of contacts mounted on the reservoir housing and engaged by one end of an actuating pin whose other end engages a camming formation on the sleeve, such as a peripheral recess, so that an axial movement of this sleeve moves the pin radially and closes or opens the contacts. It is, however, also possible to make the piston wholly or partly conductive for completing, in one or more positions, a suitable control circuit through a cooperating conductive element fixed in the master cylinder.

In accordance with another feature of my invention, a float may be disposed in the brake-fluid reservoir so as to actuate the same switch if the fluid level drops below a predetermined limit.

Figure 2:
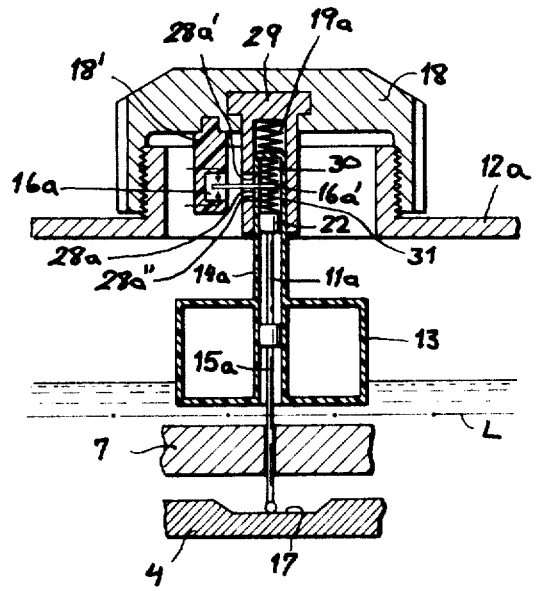
Figure 3:
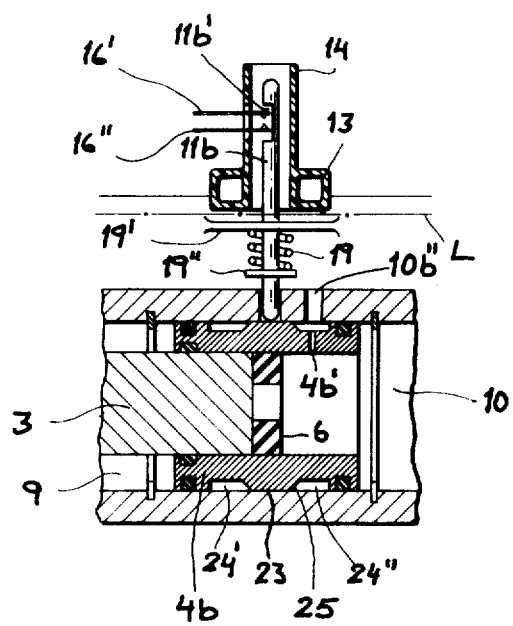
Figure 4:
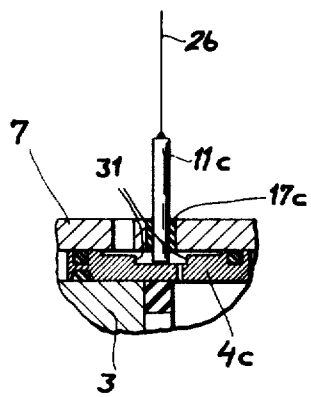

Several embodiments of the invention will now be described with reference to the accompanying drawing in which:

FIG. 1 is a longitudinal sectional view of a tandem master cylinder equipped with a warning system according to the invention; and FIGS. 2, 3 and 4 are fragmentary sectional views illustrating various modifications.

As seen in FIG. 1 a stepped plunger 1 with a narrower cylindrical extremity 3 and a wider cylindrical base 2 is linked with a driver-operated pedal for axial movement in a tandem master cylinder 7, the base 2 and the extremity 3 being separated by an annular shoulder 2'. The plunger 1 is sealed by packing rings 6 against the inner wall surface of the cylinder 7. An axially slidable sleeve 4, serving as a piston, is floatingly disposed in the master cylinder 7 between an end wall 7' thereof and the shoulder 2', the sleeve 4 being sealer against the cylinder by O-rings 5 and against the plunger 1 by packing rings 6' and by a packing disc 6'' on the end face 3' of plunger extremity 3. Annular abutments 8 and 8', protruding radially from the inner peripheral surface of cylinder 7, define the limits of the axial movement of the sleeve 4.

The sleeve 4 constitutes a fluidtight mobile partition between two chambers 9 and 10 of the master cylinder 7. Each chamber 9, 10 is connected through a respective port 9', 10' to a brake circuit of an associated vehicle, e.g. chamber 9 to the front-wheel cylinders and chamber 10 to the rear-wheel cylinders.

Sleeve 4 is formed with a peripheral groove 17 with beveled edges 20. An actuating pin 11, preferably of insulating material, engages in the grooves 17, being held in contact with the sleeve surface by a compression spring 19 braced between a collar 19'' on the pin 11 and a bracket 19' rigid with the wall of a brake-fluid reservoir 12 into which the pin 11 projects radially through a hole 21 in cylinder 7. In the illustrated normal positions of plunger 1 and sleeve 4, the reservoir 12 communicates with chamber 9 through a port 9'' and with chamber 10 through a port 10'', groove 17 and a passage 4' of sleeve 4; when the plunger is displaced to the right by actuation of the brake pedal, against the force of a restoring spring not shown, both these connections are cut off.

A float 13 with a tubular extension 14 is also located in the reservoir 12 where it rides on the surface of the brake fluid. The pin 11 passes through a bore 15 in float 13 into the extension 14 which is of insulating material and provided with a lateral slot 28.

A pair of normally open switch contacts 16, 16'' traverse the slot 28 and are mounted on a portion 12'' of a removable cap 12' of the reservoir 12 so as to be closable by engagement of pin 11 with contact 16'' or of the upper edge 28' of slot 28 with contact 16'. The upward movement of float 13 with a rise in liquid level is limited by the length of the extension 14, confronting the cap 12', so as to prevent closure of the switch by the lower slot edge 28''. The contact 16'' is grounded through a wire 27' and the contact 16' is connected through a wire 26' to a lamp 26 on the vehicle dashboard, the other side of this lamp 26' being connected to the ungrounded pole of a grounded power source 27 which may be the usual vehicle battery.

The device described above functions as follows:

As the brakes are applied by, for instance, the depression of a brake pedal (not shown) linked with the plunger 1, the stepped plunger 1 moves axially, to the right in FIG. 1, thus pressurizing the brake fluid in the chamber 9 with its annular shoulder 2' and in the chamber 10 with its end face 3'. In the case of a leak in either brake circuit the pressure is less in the corresponding chamber 9 or 10 and a pressure differential acts upon the sleeve 4 causing it to slide axially toward the side of lower pressure, thus operating the alarm device 26. If there is no leak, both pressures are equal and the sleeve 4 does not move appreciably from its illustrated normal position.

Should the level of brake fluid in the reservoir 12 drop below a critical limit L, the float 13 also descends, thereby closing the switch 16', 16''.

FIG. 2 shows a sealed double-throw switch 16a whose pivotable arm 16a' is displaceable by an insulated end 22 of a pin 11a and by the upper edge 28a' of a slot 28a of a float extension 14a guided in a fixed tube 29. This switch 16a is seen mounted on a block 18' fixed to a cover 18 of the reservoir 12a. A compression spring 19a in tube 29 resists upward movement of the pin 11a while two light compression springs 30 and 31 in tube 14a tend to hold the switch arm 16a' in a centered, open-circuited position.

As seen in FIG. 3, a sleeve 4b has an annular ridge 23 flanked on both sides by grooves 24', 24'' with beveled edges 25 for camming engagement with a pin 11b having a notch 11b' for engaging the contact 16'. A port 10b'' in the common wall of cylinder 7 and reservoir 12 communicates with the right-hand groove 24'' from which a passage 4b' extends with chamber 10.

Furthermore, as seen in FIG. 4, a fixed conducting element, here a pin 11c, is insulatedly mounted in the cylinder wall and cooperates with the edges 31 of a recess 17c of a conductive sleeve 4c connected to one terminal (e.g. ground) of the alarm circuit, the pin 11c forming with these edges 31 a set of normally open switch contacts and being connected to the "hot" lead 26' of the circuit. In this embodiment a float and another switch (not shown) can be provided, as illustrated in FIGS. 1, 2 or 3, to signal a near-depletion of the brake fluid.

Although the alarm switch controlled by the movable partition 4, 4b, 4c has been shown normally open, it will be apparent that a control circuit having a normally closed switch could also be used to light the lamp 26 in an off-normal position of the sleeve. These and other modifications, readily apparent to persons skilled in the art, are intended to be embraced within the spirit and scope of my invention as defined in the appended claims.

I claim:

1. In a vehicular hydraulic dual-brake system having a master cylinder with two chambers connected to respective brake circuits and a reservoir for supplying brake fluid to said cylinder, the combination therewith of:

piston means forming a mobile partition between the two chambers of said master cylinder;

pressurizing means independent of said piston means for concurrently generating fluid pressure in said chambers;

switch means positioned for actuation by an axial displacement of said piston means in either direction from a predetermined normal position;

means responsive to the level of brake fluid in said reservoir for actuating said switch means; and an alarm device electrically connected to said switch means for indicating both said displacement and an unfavorable level of said fluid in said reservoir.

2. The combination defined in claim 1 wherein said two chambers are arranged in tandem, said pressurizing means comprising a stepped plunger having a narrower extremity and a wider base separated by an annular shoulder, said piston means being a sleeve with an axial bore accommodating said extremity.

3. The combination defined in claim 2 wherein said sleeve is provided with a peripheral recess forming part of said switch means.

4. The combination defined in claim 3 wherein said cylinder is provided with a first port communicating with one of said chambers and with a second port communicating with said recess in a normal position of said plunger and said sleeve, the latter having a passage connecting said recess with the other of said chambers, said reservoir communicating with said ports.

5. The combination defined in claim 3 wherein said sleeve has a conductive portion formed with said recess, said switch means including a conductive element in said cylinder extending toward said recess for contacting said portion in at least one position of said sleeve.

6. The combination defined in claim 2 wherein said sleeve is provided with a peripheral camming formation for operating said switch means.

7. The combination defined in claim 6 wherein said switch means comprises a spring-loaded pin engageable with said formation.

8. The combination defined in claim 1 wherein said brake-fluid reservoir communicates with said chambers, said means responsive to said level of said fluid including a float in said reservoir cooperating with said switch means for operating said alarm device upon a drop in fluid level within said reservoir below a predetermined limit.

9. In a vehicular hydraulic dual-brake system having a master cylinder with two chambers connected to respective brake circuits, the combination therewith of:

piston means forming a mobile partition between the two chambers of said master cylinder;

pressurizing means independent of said piston means for concurrently generating fluid pressure in said chambers;

switch means positioned for actuation by an axial displacement of said piston means in either direction from a predetermined normal position; and an alarm device electrically connected to said switch means for indicating said displacement, said master cylinder being provided with a brake-fluid reservoir communicating with said chambers; and a float in said reservoir cooperating with said switch means for operating said alarm device upon a drop in fluid level within said reservoir below a predetermined limit, said switch means including a set of normally open contacts, said float having a tubular extension receiving at least one of said contacts, said switch means further including a pin partly received in said extension and positioned for displacement relative to said contacts by said piston means.

10. The combination defined in claim 9 wherein said float is provided with stop means for limiting its ascent to prevent closure of said contacts by said extension upon a rise in fluid level.